Sept. 17, 1968     M. E. WEAKLY ET AL     3,401,511
MOWER DRIVE VIBRATION DAMPENING MEANS
Filed May 31, 1966
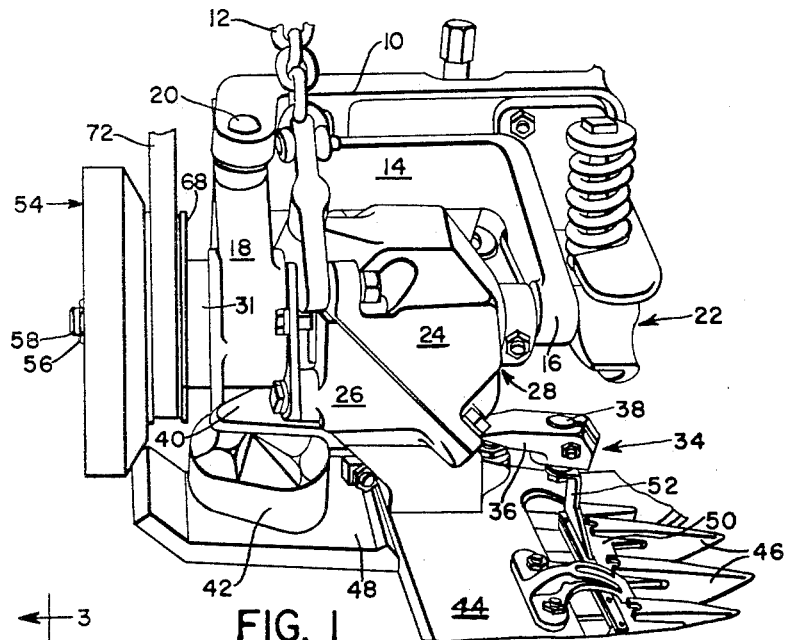
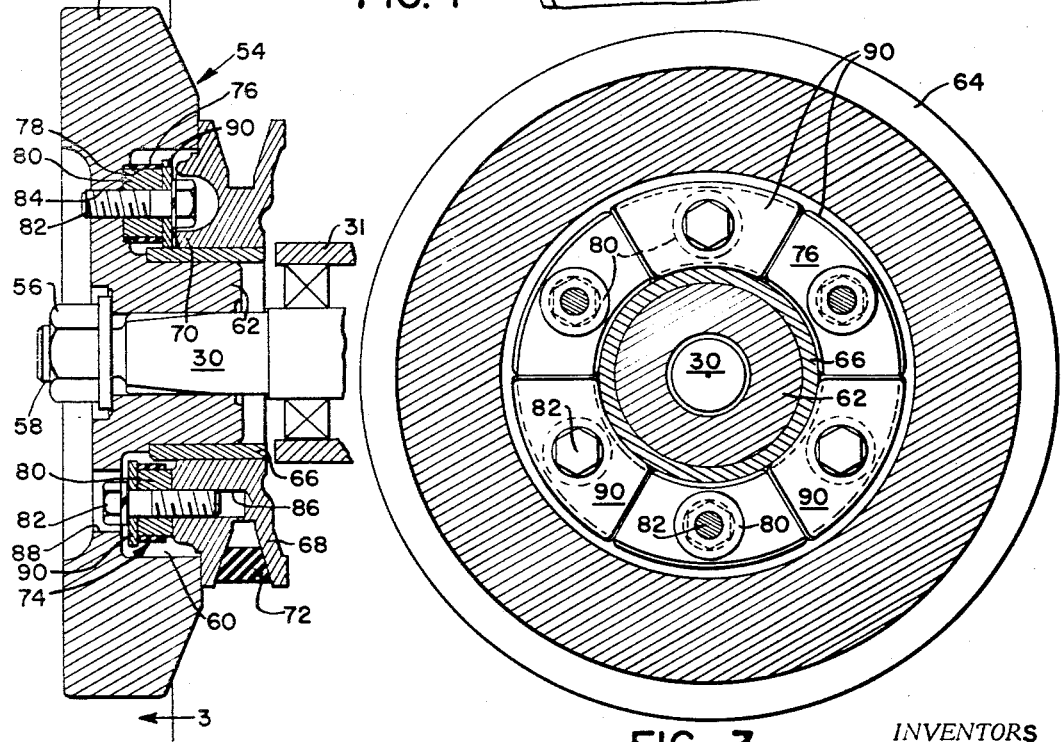
INVENTORS
M. E. WEAKLY &
R. A. GERHARDT

United States Patent Office 3,401,511
Patented Sept. 17, 1968

3,401,511
MOWER DRIVE VIBRATION DAMPENING MEANS
Marlin Earle Weakly, Moline, and Ralph August Gerhardt, Andover, Ill., assignors to Deere & Company, Moline, Ill., a corporation of Delaware
Filed May 31, 1966, Ser. No. 554,153
6 Claims. (Cl. 56—296)

This invention relates to a reciprocating cutting apparatus drive and more particularly to improved means for dampening the drive line vibration in a mower drive.

The present invention has specific utility in tractor-drawn or mounted reciprocating mowers having a wobble-type driving mechanism driven by the tractor power take-off, although the invention could also be used in other types of reciprocating mowers, such as combine cutter bars, or even in other types of mower drives, such as pitman-type drives. Since the reciprocating portion of such mower drives inherently produces substantial drive line vibration, flywheels have been provided for such mechanisms to absorb the inertia forces. However, it has been found that flywheels of practical size do not completely absorb the vibrations, so that the drive line load reversals to some extent have been fed back to the tractor power take-off mechanism, creating undesirable vibration and noise in the tractor transmission.

The primary object of the present invention is to reduce such vibration and noise by providing a flexible coupling in the rotary motion portion of the mower drive. A more specific object is to provide such a flexible coupling between the drive mechanism flywheel and the power source to absorb the drive mechanism load reversals which are not absorbed by the flywheel, and further to provide such a flexible coupling in the form of a disk of resilient material coaxially and drivingly interconnecting the flywheel and the drive mechanism input element.

These and other objects will become apparent from the following detailed description and accompanying drawings wherein a preferred embodiment of the invention is illustrated.

FIG. 1 is a fragmentary perspective view of a typical reciprocating mower including a wobble-type drive mechanism embodying the invention.

FIG. 2 is an enlarged axial section of the input portion of the mower drive mechanism.

FIG. 3 is a section view taken along the line 3—3 of FIG. 2.

The numeral 10 represents a mower frame, only a portion of which is shown. In a conventional tractor-drawn or tractor-mounted mower, the frame 10 is generally articulated and vertically swingable about one or more fore-and-aft axes, the vertical position of the mower being established by suspension control means, which, in the mower illustrated, includes a flexible support member 12. It is to be understood that such terms as "fore-and-aft," "forwardly," "rearwardly," "vertically," or "horizontally" are merely terms of convenience to more clearly describe the invention, and are not to be construed as limiting the invention.

The frame 10 also includes a generally horizontal U-shaped member 14 having forward and rearward laterally extending arms 16 and 18 respectively, the frame member 14 being swingable in a horizontal arc about a vertical pivot 20 carried by the frame 10, although the frame member 14 is normally held in the position shown by a spring loaded latching mechanism 22, which releasably secures the forward arm 16, permitting the frame member 14 and the cutting mechanism mounter thereon to break away rearwardly upon striking an obstruction as the mower advances.

The forward arm 16 carries a forward housing member 24 and the rearward arm 18 carries a rearward housing member 26, the forward and rearward housing members cooperating to form a housing substantially enclosing a wobble-type drive mechanism 28 for converting rotary motion to oscillating motion. The drive mechanism 28 includes a fore-and-aft rotating drive shaft 30 journaled in an annular portion 31 of the rearward housing member 26 via a bearing means and an oscillating output member 34 oscillating in a generally lateral direction about a vertical axis. The output member 34 includes a forwardly extending arm 36 which carries a vertical pivot 38 and a rearwardly extending arm 40 carrying a weighted member or counterbalance 42.

The rearward housing member 26 carries a laterally extending cutter bar 44 including forwardly extending mower guards 46 and a fore-and-aft inner shoe 48. A reciprocating cutter or sickle 50 oscillates laterally on the cutter bar 44, the sickle being connected to and driven by the oscillating output member 34 via an upright bracket 52 connected to the vertical pivot 38. Only a portion of the cutter bar 44 and sickle 50 are shown since they are more or less of conventional construction.

An annular flywheel 54 is coaxially secured to the rearward end of the drive shaft 30 by means of a nut 56 threaded on a threaded portion 58 at the rear end of the shaft 30. The flywheel 54 includes an annular forwardly facing recess 60 between a hub portion 62 and a weighted outer portion 64. The flywheel hub 62 coaxially supports a forwardly extending sleeve or bearing 66 on which an input V-belt sheave 68 is rotatably supported, the sheave including a hub portion 70 partially extending into the flywheel recess 60. The sheave 68 is connected to and driven by a power source (not shown) conventionally a front or rear tractor power take-off in the case of a tractor-mounted or tractor-drawn mower, by means of an endless belt 72.

The sheave 68 is drivingly connected to the flywheel 54 by means of an annular flexible coupling member 74 coaxially mounted between the sheave and flywheel in the annular recess 60. The coupling member 74 includes a ring 76 of elastomeric material, preferably rubber, having an even number of axially extending bores 78 equally spaced and equally offset from the coupling member axis. A sleeve-like spacer 80, having a slightly greater axial dimension than the rubber ring 76, is pressed into each bore 78, the spacers 80 alternately projecting beyond the opposite end faces of the rubber ring 76 and alternately seating against the flywheel 54 and the input sheave hub 70. The coupling member 74 is secured to both the sheave 68 and the flywheel 54 by a plurality of bolts 82, extending through the sleeve-like spacers and alternately being threaded in threaded bores 84 and 86 in the flywheel and sheave respectively to alternately secure the spacers to the flywheel and sheave. The flywheel 54 has an access opening 88 opposite each bolt 82 threaded into the sheave to permit assembly and disassembly of the flywheel and sheave. A relatively flat retaining member or plate 90, having substantially the same configuration as a segment of the ring 76, is mounted under the head of each bolt 82 and pressed against a radial end face of the ring 76, adjacent plates 90 seating on opposite end faces of the ring and slightly overlapping the ring 76 in a radial direction to prevent distortion of the ring in an axial direction. The plates 90 on each side of the ring 76 are equally spaced circumferentially a distance approximately equal to their circumferential dimension. Thus in the embodiment shown, wherein six bolts are provided to connect the coupling member 74 to the flywheel and sheave, six retaining plates are provided, each plate forming a 60° segment and covering one-sixth of the ring 76. The radial edges of each retaining plate 90 are broken away from the rubber ring 76 to prevent the edges of the plates from digging into the rubber. The flywheel 54 is permitted to rotate relative to the sheave 68 only to the extent that the adjacent segments of the ring 76 will stretch or compress in a circumferenial direction, the compression of the ring being limited to a degree by the retaining plates 90 which limit the axial expansion of the ring necessary for a substantial compression of any portion. In addition, the stretching and compression of the alternate segments of the ring is opposed by the stiffness of the ring material, so that only a small degree of relative rotation between the flywheel 54 and the input sheave 68 is permitted.

In operation, the drive shaft 30 is rotated by the input sheave 68 through the flywheel 54, the rotary motion of the drive shaft 30 being converted into the oscillating motion of the output member 34 by the wobble-type drive 28 mounted within the housing formed by the members 24 and 26. The inertia forces of the output member 34 and the counterweight 42 and sickle bar 50 attached thereto are absorbed to a large degree by the flywheel 54. The flexible coupling member 74 substantially absorbs the load reversals or vibrations not absorbed by the flywheel. In effect, the flexible coupling 74 isolates the sheave 68 from the reciprocating drive mechanism so that the vibrations or load reversals cannot be fed back to the power source.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a mower of the type having a cutting apparatus including a reciprocating cutter, and a drive mechanism including a rotating drive shaft, an oscillating output member drivingly connected to the cutter, and motion-converting means drivingly connecting the drive shaft to the oscillating output member, the combination therewith of a flywheel coaxially affixed to the drive shaft, an input element coaxially journaled relative to the flywheel and drive shaft, and a flexible coupling member drivingly connecting the input element to the assembled drive shaft and flywheel.

2. The invention defined in claim 1 wherein the flexible coupling member is annular in shape and includes a ring of elastic material coaxially connected to the input element and the assembled flywheel and drive shaft.

3. The invention defined in claim 2 wherein the flexible coupling member is elastically deformable to permit a small degree of relative rotation between the input element and the assembled flywheel and drive shaft.

4. The invention defined in claim 3 wherein the input element is proximate to the flywheel and the annular flexible coupling member is coaxially mounted between and connected to the flywheel and input element.

5. The invention defined in claim 4 wherein the input element comprises a sheave journaled on the flywheel.

6. The invention defined in claim 5 and including retaining plates mounted on opposite axial ends of the elastic coupling member ring, limiting distortion of the ring in an axial direction.

References Cited

UNITED STATES PATENTS

| | | | |
|---|---|---|---|
| 2,041,507 | 5/1936 | Zeder | 287—85 X |
| 2,187,923 | 1/1940 | Winkleman | 287—85 |
| 2,450,701 | 10/1948 | Wahlberg et al. | 74—574 |
| 2,597,747 | 5/1952 | Peirce | 74—574 |
| 2,815,632 | 12/1957 | Dort | 56—25 |
| 3,000,226 | 9/1961 | Muehlhausen | 74—40 |
| 3,059,499 | 10/1962 | Denil et al. | 74—574 |
| 3,108,490 | 10/1963 | Turlay | 74—574 |
| 3,113,412 | 12/1963 | Halls | 56—296 |
| 3,148,492 | 9/1964 | Naor | 56—306 |
| 3,242,766 | 3/1966 | Arnt | 74—574 |

ALDRICH F. MEDBERY, *Primary Examiner.*